(12) United States Patent
Hars

(10) Patent No.: US 8,583,712 B2
(45) Date of Patent: Nov. 12, 2013

(54) MULTI-BIT SAMPLING OF OSCILLATOR JITTER FOR RANDOM NUMBER GENERATION

(75) Inventor: Laszlo Hars, Cranberry Township, PA (US)

(73) Assignee: Seagate Technology LLC, Cupertino, CA (US)

( * ) Notice: Subject to any disclaimer, the term of this patent is extended or adjusted under 35 U.S.C. 154(b) by 978 days.

(21) Appl. No.: 11/856,766

(22) Filed: Sep. 18, 2007

(65) Prior Publication Data
US 2009/0077147 A1    Mar. 19, 2009

(51) Int. Cl.
*G06F 7/58* (2006.01)
(52) U.S. Cl.
USPC .......................................... 708/251; 708/250
(58) Field of Classification Search
None
See application file for complete search history.

(56) References Cited

U.S. PATENT DOCUMENTS

| | | | |
|---|---|---|---|
| 4,641,102 A | 2/1987 | Coulthart et al. | |
| 5,706,218 A | 1/1998 | Hoffman | |
| 6,065,029 A | 5/2000 | Weiss | |
| 6,240,432 B1 | 5/2001 | Chuang et al. | |
| 6,714,955 B2 | 3/2004 | Le Quere | |
| 6,771,104 B2 | 8/2004 | Hars | |
| 6,807,553 B2 | 10/2004 | Oerlemans | |
| 6,961,403 B1* | 11/2005 | Austin et al. | 377/80 |
| 7,461,111 B2* | 12/2008 | Yamamoto et al. | 708/255 |
| 2004/0017235 A1 | 1/2004 | Hars | |
| 2004/0019617 A1 | 1/2004 | Hars | |
| 2004/0193664 A1* | 9/2004 | Shimasaki | 708/252 |
| 2004/0264233 A1 | 12/2004 | Fukushima et al. | |
| 2004/0267845 A1 | 12/2004 | Hars | |
| 2004/0267846 A1 | 12/2004 | Hars et al. | |
| 2005/0004959 A1 | 1/2005 | Hars | |
| 2005/0004960 A1 | 1/2005 | Hars | |
| 2005/0004961 A1 | 1/2005 | Hars | |
| 2005/0193045 A1* | 9/2005 | Yamamoto et al. | 708/250 |
| 2006/0069706 A1 | 3/2006 | Lazich et al. | |

FOREIGN PATENT DOCUMENTS

| | | |
|---|---|---|
| EP | 0365930 | 5/1990 |
| EP | 1544726 | 6/2005 |
| EP | 1527384 | 9/2006 |
| GB | 2064184 | 6/1981 |

* cited by examiner

*Primary Examiner* — Michael D Yaary
(74) *Attorney, Agent, or Firm* — Cesari & Reed, LLP; Kirk A. Cesari; Christian W. Best (57) ABSTRACT

An apparatus includes an oscillator, a counter for counting pulses, and a latch for latching a count from the counter in response to changes in a logic level of an output of the oscillator. The apparatus can further include an edge detector for producing a latching signal in response to changes in the logic level of the output of the oscillator.

20 Claims, 6 Drawing Sheets

MULTI-BIT SAMPLING OF OSCILLATOR JITTER FOR RANDOM NUMBER GENERATION

BACKGROUND

There are many applications that require the fast production of random numbers including a plurality of bits. Such applications include cryptographic key generation in key servers, session keys, and nonces; simulations; Monte Carlo or randomized computations; dithering; gambling; and games. Often buffered, off-line generated random numbers can be used, but this requires a large buffer and there is a significant initial delay (i.e., latency), before the buffer is filled.

Many physical (i.e., true) random number generators use low quality (drifting) oscillators, sampled at a fixed rate. Oscillators are subject to phase noise and jitter. Phase noise and jitter are both measures of timing uncertainty in the output of an oscillator. Phase noise refers to the frequency domain uncertainty of an oscillator, while jitter is a measure of oscillator uncertainty in the time domain. If the oscillator signal is sampled at a sample rate slow enough for the phase of the oscillator to be able to drift at least a full period time, the sample will be random.

The source of the phase noise and jitter can be random (e.g., noise) or deterministic (e.g., caused by external influences). Phase noise and jitter cause amplitude and phase deviations. Phase deviation accumulates in time and drifts without bound. Phase noise and jitter can be modeled as non-stationary random processes.

Random jitter comes from many sources. Such sources include: thermal noise (e.g., vibrations of semiconductor crystal structure), imperfections due to semiconductor process variation, avalanche noise, shot noise, etc.

Deterministic jitter is created by interference signals, such as crosstalk between adjacent signal traces, electromagnetic interference (EMI) radiation, alternating current (AC) power lines, radio frequency (RF) signal sources, vibrations, noise in power layers of a multi-layer substrate, load variations caused by other parts of the circuit, etc. The noise can modulate signal voltage levels, change threshold voltages in logic gates, or change the ground reference, resulting in varying the required voltage to switch the gate, and so altering the switching time point of finite slew rate signals.

The drifting oscillator can be built as a ring oscillator that includes an odd number of inverters (or other inverting gates) connected in series (i.e., a ring), with an output fed back to the first inverter. The inverters or gates can be taken from standard digital component libraries provided by chip manufacturers. However, these gates are designed to be insensitive to noise, having very little dependency from the supply voltage, and they have large analog gain, so the switching point is quite stable. To see enough drift, millions of switching events have to take place.

If an n-stage ring oscillator output is sampled at a rate such that the expected phase drift reaches a full period time of the output, the complexity of the circuit increases linearly with the number of inverters n; the power consumption increases quadratically; and the throughput (i.e., the number of random bits generated in unit time) decreases quadratically. The largest throughput is achieved using oscillators of the shortest ring possible. For stable oscillation, the product of the analog gains of the inverters must be much larger than one at the oscillation frequency. If the product of gains is close to one, the circuit produces a sinusoidal oscillator of small output signal amplitude; if the gain is less than one, the circuit settles to an intermediate DC voltage, both of which result in large power consumption.

One can slow down the gates, for example, by inserting large resistors in series to their inputs, which form integrators with the input capacitances. This results in larger noise sensitivity, and so larger phase drift. However, resistors are not part of standard digital component libraries, so some workaround is needed, like using analog switches of finite resistance. The resistance values vary and are not always thoroughly specified, making the oscillators hard to reproduce and a redesign would be necessary at each minor change of the manufacturing process.

SUMMARY

In one aspect, the invention provides an apparatus including an oscillator, a counter for counting pulses, and a latch for latching a count from the counter in response to changes in a logic level of an output of the oscillator. The apparatus can further include an edge detector for producing a latching signal in response to changes in the logic level of the output of the oscillator.

In another aspect, the invention provides a method including: counting pulses, detecting changes in a logic level of an output of an oscillator, and latching a count in response to changes in the logic level of the output of the oscillator.

In another aspect, the invention provides an apparatus including a drifting oscillator, a sampler for sampling an output of the oscillator, and a shift register for storing samples of the output of the oscillator, wherein the state of the shift register represents a random number.

These and various other features and advantages will be apparent from a reading of the following detailed description.

DETAILED DESCRIPTION OF THE INVENTION

Figure 1:
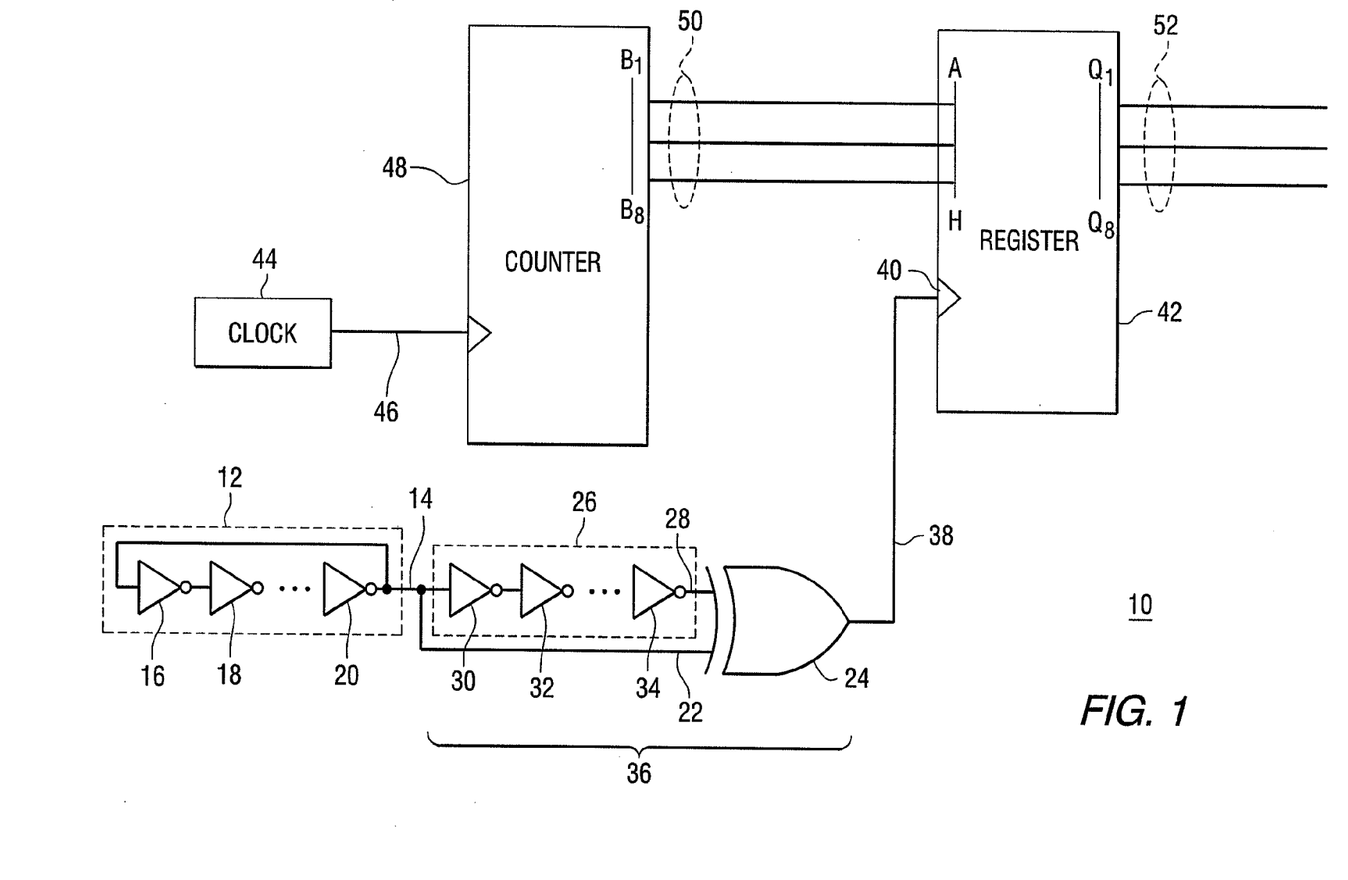
FIG. 1 is a schematic diagram of a random number generator according to one aspect of the invention.

FIG. 1 is a schematic diagram of a random number generator 10 constructed according to one aspect of the invention. In the example of FIG. 1, a drifting oscillator 12 supplies an oscillating output signal on line 14. The drifting oscillator can be, for example, a ring oscillator including an odd number of inverters or gates 16, 18, 20 electrically connected in a series with each other. An output of one of the inverters is fed back to an input of another inverter to form a ring.

The oscillating signal on line 14 is supplied to a first input 22 of an exclusive OR gate 24. A delay element 26 is used to provide a delayed version of the oscillating signal to a second input 28 of an exclusive OR gate 24. The delay element can be constructed from, for example, a series connection of (even number of) inverters 30, 32, 34, or any number of buffer gates. In one example, the delay element includes from 2 to 8 inverters.

The combination of the delay element and the exclusive OR gate forms an edge detector 36 that produces pulses on line 38 in response to rising and falling edges of the oscillator output signal. The pulses can be positive pulses at a level that changes from a logic 0-1 or a logic 1-0. These pulses are provided to a latching input 40 of a register 42.

A high speed clock 44 produces a clock signal having a plurality of pulses on line 46. The clock pulses are counted by a counter 48 to produce a count value on lines 50. This count value is input to the register on inputs A-H. When the register receives a latch signal from the edge detector, the output 52 of the register is latched at the current counter value. Due to variations in the timing of the edges in the oscillator output, the latched output 52 is a random number. To achieve reasonable randomness, the clock signal 46 has to be of higher frequency than the edges 38 of the drifting oscillator.

In the example of FIG. 1, the current count of a high speed 3 to 8-bit free running counter is latched by the edge detector pulse, and output from the register. Some microprocessors have built-in high speed counters. The detected pulse edge of the oscillator can be used as an interrupt, when a few least significant bits of the counter value is masked and collected in a ring buffer to be hashed periodically.

Figure 2:
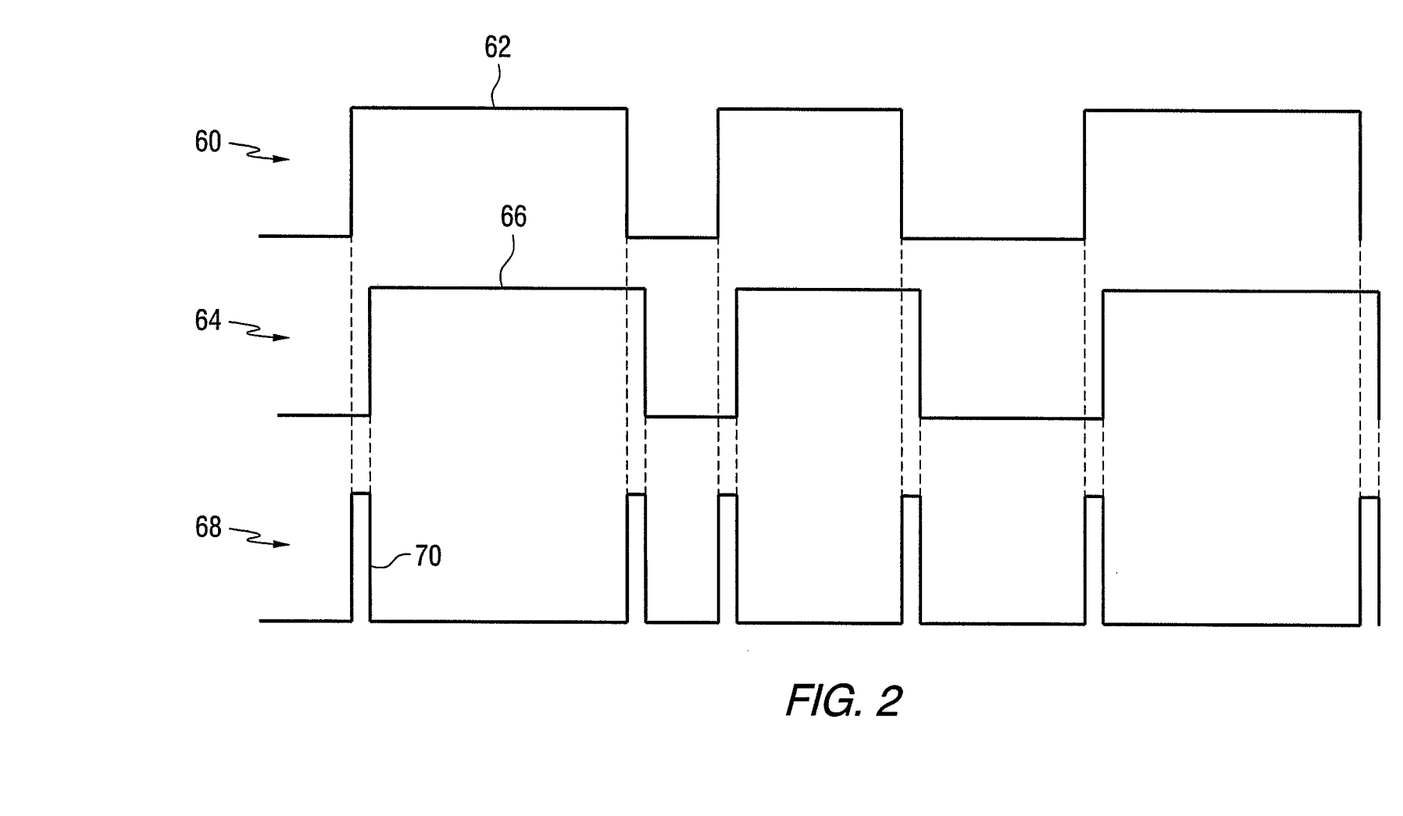
FIG. 2 is a waveform diagram illustrating an oscillator output and an edge detector output.

FIG. 2 is a waveform diagram illustrating an oscillator output and an edge detector output. Waveform 60 represents the output of the oscillator on line 14 in FIG. 1, and includes a series of pulses 62. Waveform 64 represents the oscillator output after it has been delayed by the delay element 26 in FIG. 1, and includes a series of pulses 66. Waveform 68 represents the output of the exclusive OR gate on line 38 in FIG. 1, and includes a series of edge detector pulses 70. Pulses 70 are used to latch the register in FIG. 1. Since waveform 60 is subject to jitter, the timing of the rising and falling edges will be unpredictable. Therefore the timing of pulses 70 will be unpredictable, and the output of the register will be a random number. While the waveforms in FIG. 2 are shown to be rectangular pulses, it should be understood that these waveforms are provided to illustrate the operation of the edge detector, and that in a practical system the pulses may not be rectangular.

The fluctuation of the time interval between changes in the logic level of the oscillator output is the jitter. It has a close to normal distribution, so the entropy is less than that of uniformly distributed phase jitter values.

In one aspect, this invention provides an improvement of previous clock sampling techniques. At the change (i.e., a rise or fall) of the drifting oscillator output, a fast incremented counter is latched. This provides a random number generator architecture, based on accurate measurements of the jitter at the changes of the logic level of an output of an oscillator.

Instead of the traditional slow sampling of a drifting oscillator, after many oscillation periods one could take a burst of samples around a sequence of time points to find the closest moments when the oscillator output changes. This way the edge detection is done by logic circuits or by software, examining the values in the bursts of samples.

Another implementation possibility is to run a high speed sampling process, continuously. Again, in the resulting sequence of 0's and 1's a logic circuit or some software could locate different neighbor bits, telling the time points when the drifting oscillator signal changes logic levels.

There are many implementation possibilities of the same idea, such as resetting the counter to 0 after its value C0 has been latched; or keeping the last or second last latched counter value in registers C1 or C2, and return the first or second order difference: C1–C0, or C2–C0, respectively.

Note that the counter clock need not be very accurate. A clock jitter would improve the overall randomness of the circuit output.

For cryptographic applications the generated sequence has to be securely hashed, which whitens the sequence. If 8 bit samples give more than 2 bit entropy, a 4-to-1 reduction of the bit rate gives close to perfect random sequences. A 512 bit input is transformed to a 128 bit output, for example by a four stage CBC encryption with AES, using any key (CBC-MAC).

The yield of bits per second produced by the random number generator can be determined based on the frequency of the drifting oscillator F; the jitter J; the clock frequency $F_C$; and the counter period C. The optimum randomness per counter resolution is achieved when the length of the interval [–J, J] is about the same as the clock periods:

$$\frac{2J/\sqrt{2}}{F} \approx \frac{C}{F_C},$$

or $$F_C \approx \frac{C \cdot F}{J\sqrt{2}}.$$

The yield of the random number generator is $\log_2 C$ bits in about $1/(2F)$ time, that is, Yield=$2F \cdot \log_2 C$ bits/second.

In one example implementation of the above described random number generator the yield can be determined where the jitter is the standard deviation of the switching time variation, relative to the oscillation period=20%; F=20 MHz; $F_c$=1 GHz; and C=16. The edges of the oscillator output signal jitter by $$\frac{J}{\sqrt{2}}(14\%).$$

In this example, a 4-bit counter gives C=16, and $F_c \approx 16 \cdot 20$ MHz/0.28=1.13 GHz. This provides 4*40 Mb/s=160 Mb/s yield of random bits.

In other example, the counter period C for a B-bit counter is $2^B$. If a 6-bit counter were used (C=64), the corresponding clock frequency would be 4.5 GHz; this may be too high for normal applications. A 3-bit counter is more realistic, with C=8 and $F_c$=566 MHz, with a yield of 120 Mb/s, or a 2-bit counter with $F_c$=283 MHz clock, 80 Mb/s yield. It is still twice as many random bits per second than a drifting oscillator would provide using sampling by fast clock (~1-bit counter).

Of course, one can use large counters at lower than optimal clock frequencies. Unfortunately, the samples will be correlated. Hashing could still give slightly higher yield than at the optimum clock frequency at the expense of the larger counter and more hashing operations.

An advantage of this type of random number generators is that synchronization of the oscillator frequency to external signals does not degrade the randomness, because the jitter does not depend on the oscillator frequency. Modulating the jitter by external signals only adds to the always present random jitter, so the randomness is not affected until this influence becomes extremely large, which is easy to detect. For example, another identical copy of the generator can be built. If the two generators provide correlated output, a strong external influence is detected. Another possibility is signal processing of the sequence of phase jitter values, monitoring the noise floor or looking for strong periodic frequency components.

In one aspect, this invention provides an effective way of using oscillator phase jitter for random number generation by sampling a free running counter at times that vary with jitter. The resulting random number generators are faster than the ones based on oscillator sampling most commonly used in practice, and employ only one oscillator avoiding issues with internal synchronizations.

In another aspect, the invention can provide high quality, yet inexpensive and fast random number generators, which eliminate the need for secure buffering in many applications.

Figure 3:
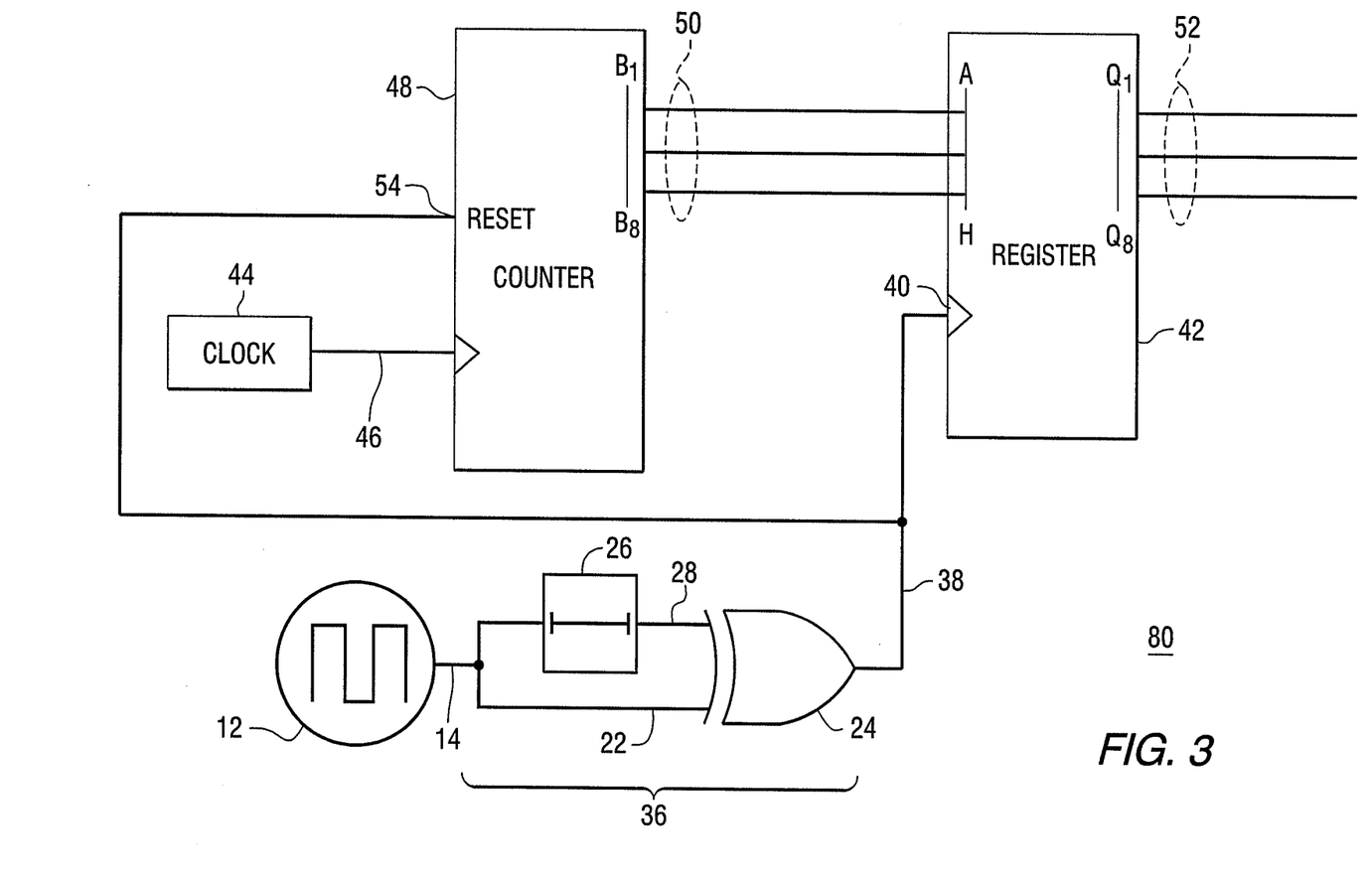
FIG. 3 is a schematic diagram of a random number generator according to another aspect of the invention.

There are other possible implementations, which provide similar randomness, but may offer implementation advantages in special circumstances. FIG. 3 is a block diagram of a random number generator 80 according to another aspect of the invention. In the example of FIG. 3, a drifting oscillator 12 supplies an oscillating output signal on line 14. As in FIG. 1, the drifting oscillator can be, for example, a ring oscillator.

The oscillating signal on line 14 is supplied to a first input 22 of an exclusive OR gate 24. A delay element 26 is used to provide a delayed version of the oscillating signal to a second input 28 of an exclusive OR gate 24. As in FIG. 1, the delay element can include, for example, a series connection of inverters. In one example, the delay element includes from 2 to 8 inverters.

The combination of the delay element and the exclusive OR gate forms an edge detector 36 that produces pulses on line 38 in response to rising and falling edges of the oscillator output signal. The pulses can be positive pulses at a level that changes from a logic 0-1 or a logic 1-0. These pulses are provided to a latching input 40 of a register 42.

A high speed clock 44 produces a clock signal having a plurality of pulses on line 46. The clock pulses are counted by a counter 48 to produce a count value on lines 50. This count value is input to the register on inputs A-H. When the register receives a latch signal from the edge detector, the output 52 of the register is latched at the current counter value. Due to variations in the timing of the edges, the latched output is a random number. In the circuit of FIG. 3, the output of the edge detector is connected to a reset input 54 of the counter such that a pulse on line 38 restarts the counter.

Figure 4:
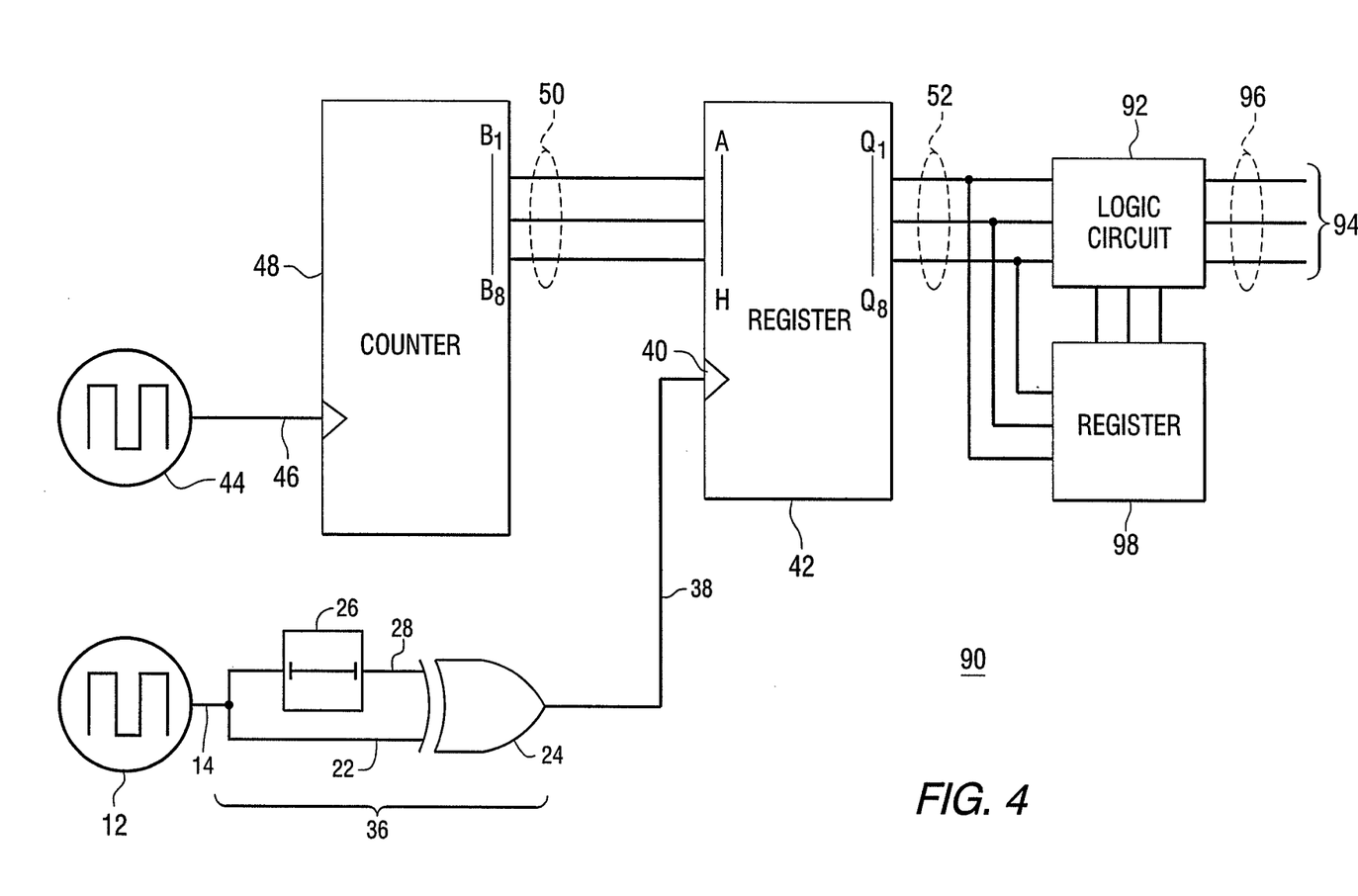
FIG. 4 is a schematic diagram of a random number generator according to another aspect of the invention.

FIG. 4 is a block diagram of a random number generator 90 according to another aspect of the invention. In the example of FIG. 3, a drifting oscillator 12 supplies an oscillating output signal on line 14. As in FIG. 1, the drifting oscillator can be, for example, a ring oscillator.

The oscillating signal on line 14 is supplied to a first input 22 of an exclusive OR gate 24. A delay element 26 is used to provide a delayed version of the oscillating signal to a second input 28 of an exclusive OR gate 24. As in FIG. 1, the delay element can include, for example, a series connection of inverters. In one example, the delay element includes from 2 to 8 inverters.

The combination of the delay element and the exclusive OR gate forms an edge detector 36 that produces pulses on line 38 in response to rising and falling edges of the oscillator output signal. The pulses can be positive pulses at a level that changes from a logic 0-1 or a logic 1-0. These pulses are provided to a latching input 40 of a register 42.

A high speed clock 44 produces a clock signal having a plurality of pulses on line 46. The clock pulses are counted by a counter 48 to produce a count value on lines 50. This count value is input to the register on inputs A-H. When the register receives a latch signal from the edge detector, the output 52 of the register is latched at the current counter value. Due to variations in the timing of the edges, the latched output is a random number.

A logic circuit 92 receives the output 52 and produces a random number 94 on lines 96. A register 98 stores the latched count output 52. Then the logic circuit uses both a current latched count output 52 and a previous latched count output to produce the random number. For example, the logic circuit can calculate the differences or the second order differences of the latched counter values to produce the random number output.

Figure 5:
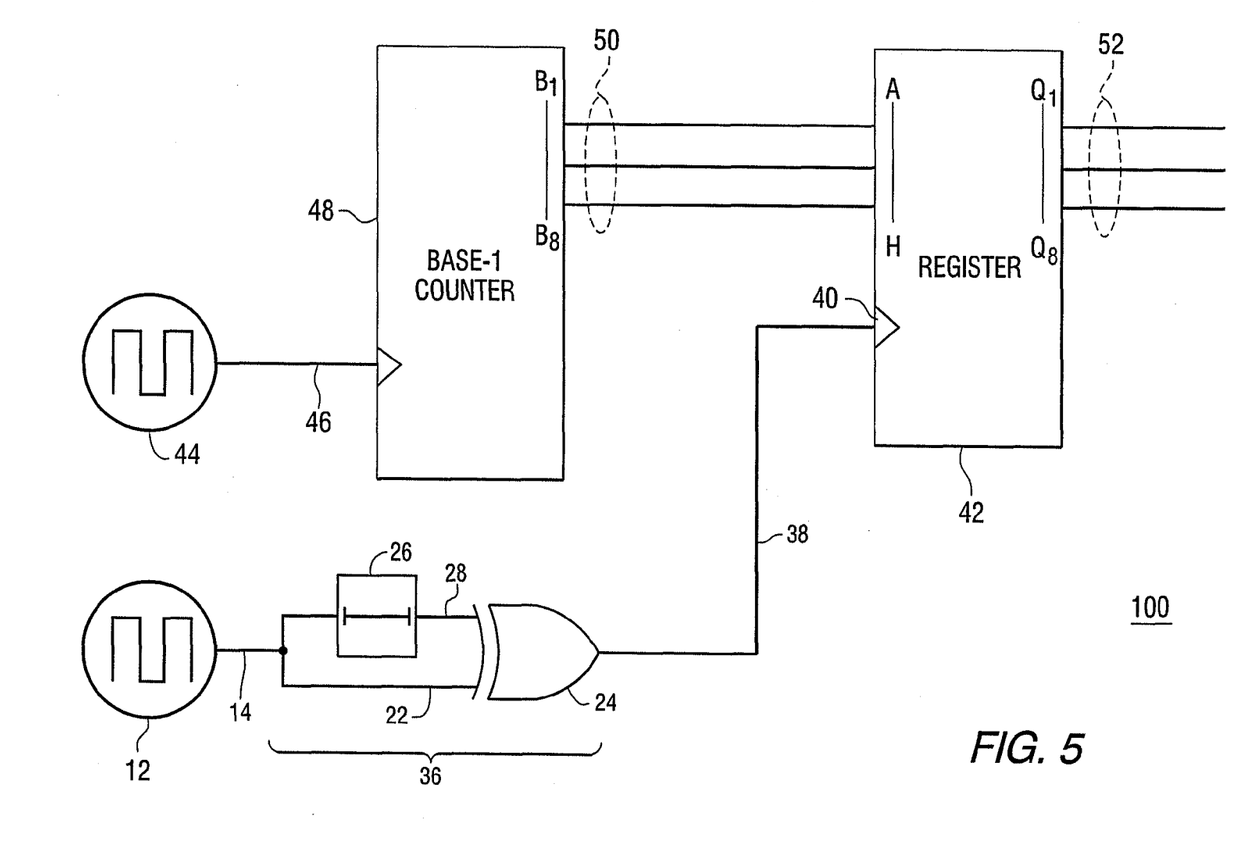
FIG. 5 is a schematic diagram of a random number generator according to another aspect of the invention.

FIG. 5 is a block diagram of a random number generator 100 according to another aspect of the invention. In the example of FIG. 5, a drifting oscillator 12 supplies an oscillating output signal on line 14. As in FIG. 1, the drifting oscillator can be, for example, a ring oscillator.

The oscillating signal on line 14 is supplied to a first input 22 of an exclusive OR gate 24. A delay element 26 is used to provide a delayed version of the oscillating signal to a second input 28 of an exclusive OR gate 24. As in FIG. 1, the delay element can include, for example, a series connection of inverters. In one example, the delay element includes from 2 to 8 inverters.

The combination of the delay element and the exclusive OR gate forms an edge detector 36 that produces pulses on line 38 in response to rising and falling edges of the oscillator output signal. The pulses can be positive pulses at a level that changes from a logic 0-1 or a logic 1-0. These pulses are provided to a latching input 40 of a register 42.

A high speed clock 44 produces a clock signal having a plurality of pulses on line 46. The clock pulses are counted by a base-1 counter 102 to produce a count value on lines 50. The base-1 counter can be a shift register that contains a single 1 value and a plurality of zeros. With each clock pulse, the 1 is shifted within the shift register. The position of the 1 value determines the count value. This count value is input to the register on inputs A-H. When the register receives a latch signal from the edge detector, the output 52 of the register is latched at the current counter value. Due to variations in the timing of the edges, the latched output is a random number.

The circuit of FIG. 5 uses a base-1 counter (e.g., a shift register) and decodes the output only before or after latching.

Figure 6:
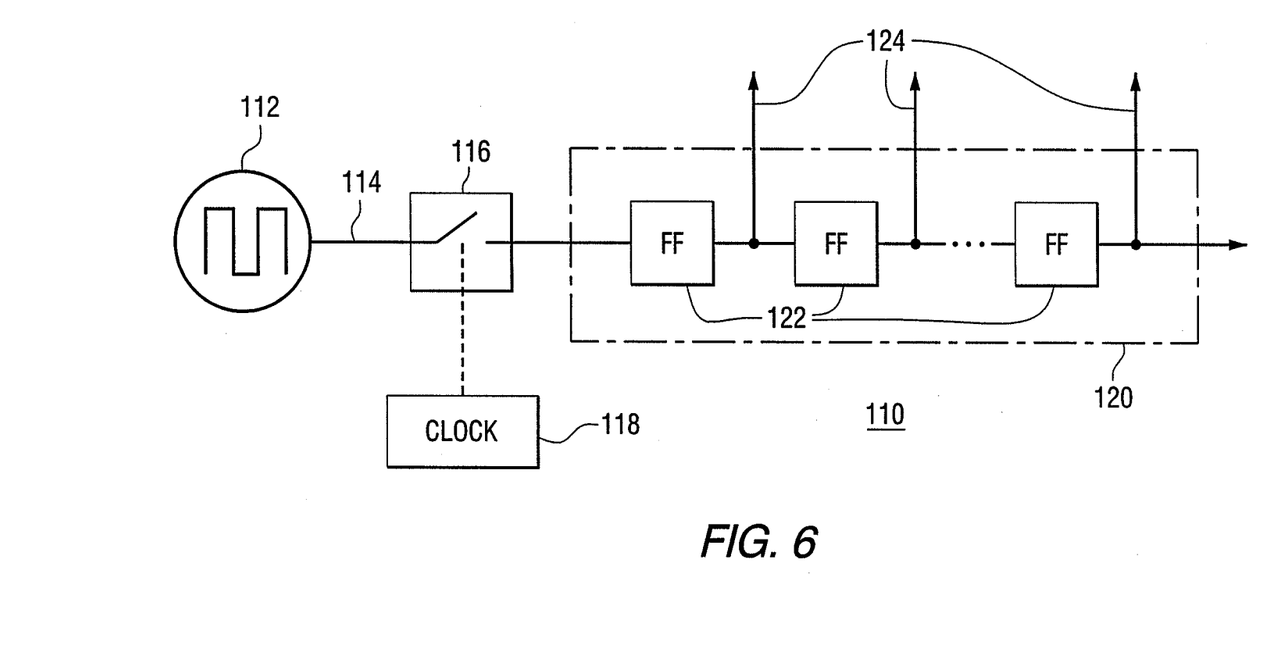
FIG. 6 is a schematic diagram of a random number generator according to another aspect of the invention.

FIG. 6 is a block diagram of a random number generator 110 according to another aspect of the invention. In the example of FIG. 6, a drifting oscillator 112 supplies an oscillating output signal on line 114. As in FIG. 1, the drifting oscillator can be, for example, a ring oscillator.

The oscillating signal on line 114 is sampled continuously, as illustrated by sampler 116, at a high frequency according to clock 118, instead of only at oscillation edges. The sampled values are stored in a ring buffer 120, which captures changes of logic level. In this example, the ring buffer includes a plurality of flip-flop circuits 122, with the state of each flip-flop being readable on lines 124. Then the flip-flop values can be decoded at regular periods.

In various aspects, this invention can employ standard logic components in addition to the standard drifting oscillator. It can be orders of magnitude faster than sampled ring oscillators. It can be several times faster than high frequency oscillators sampled by jittery signals. It can be implemented using a single drifting oscillator, so there would be no cross correlation issues between different oscillators. It is also less sensitive to strong external influences than sampling the phase drift after many oscillation periods.

The implementations described above and other implementations are within the scope of the following claims.

What is claimed is:

1. An apparatus comprising:
   a drifting oscillator to produce an oscillator output signal;
   an edge detector to produce a latch signal in response to changes in a logic level of the oscillator output signal;
   a counter to count clock pulses and produce a count value; and
   a register including a latch input and a register output, the register to store the count value and to provide the count value at the register output when the latch signal is received at the latch input.

2. The apparatus of claim 1, wherein the edge detector comprises:
   an exclusive OR gate having a first input coupled to the drifting oscillator to receive the oscillator output signal and a second input; and
   a delay element to receive the oscillator output signal and produce a delayed oscillator output signal to the second input of the excusive OR gate.

3. The apparatus of claim 2, wherein the delay element comprises:
   a plurality of series connected inverters.

4. The apparatus of claim 1, further comprising:
   a register for storing a previously latched count; and
   a logic circuit for determining a difference between a currently latched count and the previously latched count.

5. The apparatus of claim 1, wherein the counter comprises: a base-1 counter.

6. The apparatus of claim 5, wherein the base-1 counter comprises: a shift register.

7. The apparatus of claim 1, wherein the counter is restarted in response to changes in the logic level of the oscillator output signal.

8. The apparatus of claim 1, wherein the frequency of the clock signal is higher than a frequency of the changes in the logic level of the oscillator output signal.

9. A method comprising:
   generating a random number by:
      storing a count value of clock pulses in a register;
      detecting a change in a logic level of an output of a drifting oscillator;
      providing a latch signal to the register when the change is detected; and
      providing the count value of the clock pulses at an output of the register when the latch signal is received.

10. The method of claim 9, further comprising detecting the change in the logic level using an edge detector including an exclusive OR gate having a first input coupled to the output of the drifting oscillator and a second input coupled to a delay element that receives the output of the drifting oscillator and produces a delayed oscillator output signal to the second input of the excusive OR gate.

11. The method of claim 9, wherein the count value is reset after each latch signal.

12. The method of claim 9, wherein the clock pulses are counted using a base-1 counter.

13. The method of claim 9, further comprising:
    storing a previous count value; and
    determining a difference between a current count value and the previous count value.

14. The method of claim 9, wherein a frequency of the clock pulses is higher than a frequency of the change in the logic level of the output of the drifting oscillator.

15. The method of claim 9, wherein providing the count value of the clock pulses at the output of the register comprises: applying an interrupt signal to a processor.

16. A circuit comprising:
    a detector configured to produce a latch signal in response to changes in an oscillator output signal;
    a counter to count clock pulses and produce a count value; and
    a register including a latch input and a register output, the register configured to store the count value and to provide the count value at the register output when the latch signal is received at the latch input.

17. The circuit of claim 16, wherein the detector further comprises:
    an exclusive OR gate having a first input and a second input, the first input coupled to the drifting oscillator to receive the oscillator output signal; and
    a delay element having an input to receive the oscillator output signal and an output to provide a delayed oscillator output signal to the second input of the excusive OR gate.

18. The circuit of claim 17, wherein the delay element further comprises a series connection of inverters.

19. The apparatus of claim 17 further comprising a clock configured to produce the clock pulses, wherein the counter updates the count value based on a frequency of the clock pulses.

20. The circuit of claim 19 further comprising a drifting oscillator configured to produce the oscillator output signal.

* * * * *